(12) United States Patent
Ruchet et al.

(10) Patent No.: US 9,287,974 B2
(45) Date of Patent: *Mar. 15, 2016

(54) METHOD AND APPARATUS FOR TESTING TRANSMISSION LINES NORMALLY PROPAGATING OPTICAL SIGNALS

(71) Applicant: EXFO Inc., Quebec (CA)

(72) Inventors: Bernard Ruchet, Quebec (CA); Normand Cyr, Quebec (CA)

(73) Assignee: EXFO INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,890

(22) Filed: Aug. 26, 2014

(65) Prior Publication Data

US 2014/0363157 A1  Dec. 11, 2014

Related U.S. Application Data

(63) Continuation of application No. 13/204,350, filed on Aug. 5, 2011, now Pat. No. 8,861,953, which is a continuation of application No. 11/713,735, filed on Mar. 5, 2007, now Pat. No. 7,995,915, which is a (Continued)

(51) Int. Cl.
*H04B 10/08* (2006.01)
*H04B 10/079* (2013.01)

(Continued)

(52) U.S. Cl.
CPC ............ *H04B 10/07955* (2013.01); *H04B 3/46* (2013.01); *H04B 10/079* (2013.01);

(Continued)

(58) Field of Classification Search
CPC ...................... H04B 10/07955; H04B 10/0793; H04B 10/0795; H04B 3/46; H04B 10/079; H04B 10/07953; H04Q 11/0067; H04Q 2011/0083
USPC ..................................................... 398/38, 25
See application file for complete search history.

(56) References Cited

U.S. PATENT DOCUMENTS 4,234,253 A  11/1980  Higginbotham et al.
4,673,291 A   6/1987  Heckmann
(Continued)

FOREIGN PATENT DOCUMENTS

DE   19928940   1/2001
EP    0786878   7/1997
(Continued)

OTHER PUBLICATIONS

IBM Understanding Optical Communications, International Technical Support Organization, Sep. 1998, pp. 185-193, 228, 237, and 419-421.

(Continued)

*Primary Examiner* — M. R. Sedighian
(74) *Attorney, Agent, or Firm* — Helene Chotard

(57) ABSTRACT

A portable apparatus for measuring parameters of optical signals propagating concurrently in opposite directions in an optical transmission path between two elements, at least one of the elements being operative to transmit a first optical signal (S1) only if it continues to receive a second optical signal (S2) from the other of said elements, comprises first and second connector means for connecting the apparatus into the optical transmission path in series therewith, and propagating and measuring means connected between the first and second connector means for propagating at least the second optical signal (S2) towards the one of the elements, and measuring the parameters of the concurrently propagating optical signals (S1, S2). The measurement results may be displayed by a suitable display unit. Where one element transmits signals at two different wavelengths, the apparatus may separate parts of the corresponding optical signal portion according to wavelength and process them separately.

21 Claims, 5 Drawing Sheets

Related U.S. Application Data continuation-in-part of application No. 10/538,768, filed on Jun. 10, 2005, now Pat. No. 7,187,861, which is a continuation-in-part of application No. PCT/CA2004/001552, filed on Aug. 23, 2004.

(60) Provisional application No. 60/511,105, filed on Oct. 15, 2003.

(51) Int. Cl.
  *H04B 3/46* (2015.01)
  *H04Q 11/00* (2006.01)

(52) U.S. Cl.
  CPC ........ *H04B10/0793* (2013.01); *H04B 10/0795* (2013.01); *H04B 10/07953* (2013.01); *H04Q 11/0067* (2013.01); *H04Q 2011/0083* (2013.01)

(56) References Cited

U.S. PATENT DOCUMENTS

| | | | |
|---|---|---|---|
| 4,726,676 A | | 2/1988 | Maslaney et al. |
| 4,737,026 A | | 4/1988 | Dalgoutte et al. |
| 4,737,027 A | | 4/1988 | Maeda |
| 4,799,790 A | | 1/1989 | Tsukamoto et al. |
| 4,901,003 A | | 2/1990 | Clegg |
| 5,305,078 A | | 4/1994 | Lamonde |
| 5,383,015 A | | 1/1995 | Grimes |
| 5,455,672 A | | 10/1995 | Lamonde et al. |
| 5,535,038 A | | 7/1996 | Hinch |
| 5,537,500 A | | 7/1996 | Yokoyama |
| 5,696,707 A | | 12/1997 | Hentschel et al. |
| 5,825,516 A | | 10/1998 | Walsh |
| 6,072,614 A | * | 6/2000 | Roberts ........................ 398/177 |
| 6,111,676 A | * | 8/2000 | Lemus et al. ..................... 398/1 |
| 6,188,509 B1 | | 2/2001 | Lee et al. |
| 6,396,575 B1 | * | 5/2002 | Holland ........................ 356/73.1 |
| 6,476,919 B1 | | 11/2002 | Mori et al. |
| 6,480,977 B1 | | 11/2002 | Apisdorf et al. |
| 6,600,594 B1 | | 7/2003 | Ko et al. |
| 6,748,169 B1 | | 6/2004 | Geiger et al. |
| 6,839,523 B1 | * | 1/2005 | Roberts ........................ 398/177 |
| 7,187,861 B2 | * | 3/2007 | Ruchet .............................. 398/9 |
| 7,254,325 B2 | * | 8/2007 | Hoshida ........................... 398/25 |
| 7,995,915 B2 | * | 8/2011 | Ruchet et al. .................... 398/9 |
| 8,861,953 B2 | * | 10/2014 | Ruchet et al. .................. 398/33 |
| 2001/0048537 A1 | * | 12/2001 | Sussman et al. ............. 359/110 |

FOREIGN PATENT DOCUMENTS

| | | |
|---|---|---|
| EP | 0652651 | 1/2002 |
| WO | 9967609 | 12/1999 |
| WO | 0133746 | 5/2001 |
| WO | 0176109 | 10/2001 |

OTHER PUBLICATIONS

Kopie von SuperComm Press Release—Acterna Launches Premium-Class All-in-One Optical Handheld Instrument, Jun. 3, 2003.
OLC-65 Lieferschein-Siemens, Aug. 2003.
OLC Manual Annotated—Acterna OLC-65, Optical Level Controller, V 1.00, Operating Manual, Jun. 2003.
Acterna OLC-65, Optical Level Controller, V 1.00, Operating Manual, Jun. 2003.
OLC-65 Block Service, Jun. 2003.
Acterna (JDSU) Optical Level Controller OLC-65 Press Release, Jun. 2003.
HP Journal, Jan. 1985, vol. 36, No. 1.
WWG Bit 84 Article p. 8-9 (2000 or earlier).
Blumenthal et al., "Optical Performance Monitoring in Reconfigurable WDM Optical Networks Using Subcarrier Multiplexing", Journal of Lightwave Technology, vol. 18, No. 12, Dec. 2000.
Unknown authors(s), "The Pros and Cons of Tapping and Mirroring", White Paper by Finisar, Nov. 2002.
Unkown author(s), "Fiber Taps Installation and User's Guide", Doc. No. P/N 1015503, RevB, 14 pages, Finisar, US, May 2003.
"GT-C Gigabit Ethernet Traffic Checker", product description by Finisar, May 1999.
"Acterna Optical Handheld Testers—Optical power meters, attenuators, light sources" product description by Acterna Communications Test and Management Solutions, 2004.
David Greenfield, "Passive Optical Networks", Dec. 2001.
David Cleary, "Fundamentals of a Passive Optical Network (PON)", Oct. 2004.
John E. George, "Optical System Design Considerations for FTTP Networks", FTTH Conference 2003, p. 1-p. 10.
ITU-T L.40: Series L: Construction, Installation and Protection of Cables and Other Elements of Outside Plant: Optical fibre outside plant maintenance support, monitoring and testing system (Oct. 2000).
Nobuo Tomita et al., "Design and Performance of a Novel Automatic Fiber Line Testing System with OTDR for Optical Subscriber Loops", Journal of Lightwave Technology, vol. 12, No. 5, May 1994, pp. 717-726.
Yoichi Maeda, "B-PON conformance test results in Makuhari, Japan", presentation slides (Apr. 3, 2004).
"Throughput is essential in production" in "Power Meter R&S NRP", pp. 7-10 (Dec. 2012).
ITU-T Recommendation G.983.1, "Broadband optical access systems based on Passive Optical Networks (PON)" (Jan. 2005).
ITU-T Recommendation G.957, "Optical interfaces for equipments and systems relating to the synchronous digital hierarchy" (Mar. 2006).

\* cited by examiner

METHOD AND APPARATUS FOR TESTING TRANSMISSION LINES NORMALLY PROPAGATING OPTICAL SIGNALS

CROSS-REFERENCE TO RELATED APPLICATIONS

This application is a Continuation of U.S. patent application Ser. No. 13/204,350 filed Aug. 5, 2011 as a Continuation of U.S. patent application Ser. No. 11/713,735 filed Mar. 5, 2007 as a Continuation-in-Part of U.S. patent application Ser. No. 10/538,768 filed Jun. 10, 2005 as a Continuation-in-Part of International patent application No. PCT/CA2004/001552 filed Aug. 23, 2004 which designated the United States of America, and claimed priority from U.S. Provisional patent application No. 60/511,105 filed Oct. 15, 2003. The entire contents of each of these prior related applications are incorporated herein by reference.

TECHNICAL FIELD

The invention relates to a method and apparatus for testing transmission lines normally propagating optical signals and is especially, but not exclusively, applicable to a method and apparatus for measuring parameters of optical signals in optical transmission lines of passive optical networks.

BACKGROUND ART

As the cost of optical fiber and associated components decreases, new telecommunications network deployments increasingly use optical fiber from the edge of a core network to a location at or very close to the end user. Such so-called FTTX (Fiber-to-the-X; where X is the home, the office, the building, the premises, the curb, etc.) installations are usually based on a passive optical network (PON) architecture, where a terminal at the core-network edge (Optical Line Terminal—OLT) broadcasts signals downstream along a fiber-optic cable to a N-port splitter, and each of the ports then terminates at an optical network terminal (ONT) located at a respective one of the end users' premises. Typically, downstream signals are at either of two wavelengths, vis. 1490 nm for the downstream transmission of digital data and 1550 nm for the transmission of cable television (CATV) signals, while each end user's optical network terminal (ONT) transmits upstream data signals at a wavelength of approximately 1310 nm. It should be noted that the CATV signals are often transmitted in analog format.

An asynchronous transfer mode (ATM) or similar protocol is often used to encode the downstream and upstream data signals. The OLT includes in the downstream 1490-nm signals synchronization signals which permit each of the ONTs to send its upstream (1310-nm) signals in its own unique time slot so as to avoid interference with signals from other ONTs connected on the PON. For this reason, as well as for reasons of eye safety, there is no 1310-nm transmission from the ONTs when the fiber link is disconnected, thereby preventing reception of the 1490-nm downstream-data signal.

Field maintenance of such FTTX installations requires low-cost and easy-to-use diagnostic test instruments to measure the signals. An example of such diagnostic test instruments is an optical power meter that can independently measure the power at the distinct downstream and upstream signal wavelengths (e.g. 1310 nm, 1490 nm, 1550 nm). During a repair call, the results of such a measurement could indicate the source of possible trouble in the network or in the end-user's connection. It is also known to use optical spectrum analyzers (OSA) to measure optical power at several wavelengths at the same time.

A disadvantage of each of these instruments is that it is a one-port device that only measures the power if the signals at the different wavelengths are propagating in the same direction along the fiber. In the case of the OSA, a further disadvantage is that the instrument is generally much too costly and complicated for routine field applications.

SUMMARY

The present invention seeks to eliminate, or at least mitigate, the disadvantages of the prior art instruments, or at least provide an alternative and, to this end, provides a portable instrument for measuring parameters, e.g. optical power, of analog or digital optical signals that are propagating concurrently in opposite directions in an optical transmission path between two elements, such as network elements of a passive optical network, at least one of which elements will not transmit its optical signals if it ceases to receive signals from the other of the two elements.

According to one aspect of this invention, there is provided portable apparatus for connecting into (tapping) an optical transmission line normally carrying optical signals propagating concurrently in opposite directions, said apparatus comprising first and second connector means for connecting the apparatus into the optical transmission path in series therewith, and propagation means connected between the first and second connector means for propagating said at least one of said signals while extracting a portion of either said at least one of said signals or another of said signals.

The propagation means may also comprise means for detecting and processing said portion to determine parameters of said at least one of said signals or another of said signals.

According to another aspect of the present invention, there is provided portable apparatus for measuring parameters of optical signals normally propagating concurrently in opposite directions in an optical transmission path between two elements, at least one of the elements being operative to transmit a first optical signal (S1) only if it continues to receive a second optical signal (S2) from the other of said elements. The apparatus comprises first and second connector means for connecting the apparatus into the optical transmission path in series therewith, and propagating and measuring means connected between the first and second connector means for propagating at least the second optical signal (S2) towards the one of the elements, and measuring the parameters of the concurrently propagating optical signals (S1, S2).

The measurement results may be displayed by a suitable display unit.

Where one element transmits signals at two different wavelengths, the apparatus may separate parts of the corresponding optical signal portion according to wavelength and process them separately.

According to another aspect of the present invention, there is provided a portable test instrument for measuring respective parameters of a first optical signal (S1) and a second optical signal (S2) propagating concurrently in opposite directions in an optical transmission path (16, 16/1, . . . , 16/9) between two network elements (10, 14/1, . . . , 14/9), at least one (14/1, . . . , 14/9) of the network elements being operative to transmit the first optical signal (S1) only if it continues to receive the second optical signal (S2) from the other (10) of said network elements, the portable test instrument comprising first and second connector means (22, 24) for temporarily connecting the portable test instrument into the optical transmission path in series therewith, and propagating and measuring means (32, 38, 46) connected between the first and second connector means for propagating at least said second optical signal (S2) towards said at least one (14) of the network elements, the propagating and measuring means (32, 38, 46) being operable to measure the parameter for each of the first optical signal (S1) and the second optical signal (S2). The propagating and measuring means comprises coupler means (32) having first and second ports (28,30) connected to the first and second connector means, respectively, so that a path therebetween within the coupler means completes the optical transmission path, a third port (34) for outputting a portion of each optical signal received via the second port (30) and a fourth port (36) for outputting a portion of each optical signal received via the first port (28) and detection means (38, 42, 44) coupled to the third and fourth ports for converting the optical signal portions into corresponding electrical signals.

Where said one of the network elements also normally receives via said optical transmission path a third optical signal (S3) at a different wavelength from that of said second optical signal (S2), the propagating and measuring means may further comprise means for measuring parameters of the third optical signal (S3).

Where said one of the network elements also normally receives via the optical transmission path a third optical signal (S3) at a different wavelength to that of said second optical signal (S2), the propagating and measuring means may further comprise a wavelength discriminator, for example a wavelength division multiplexer, connected to the coupler means for separating at least a portion (S2', S3') of the combined second and third optical signals (S2, S3) according to wavelength to obtain corresponding separate parts (S2", S3") and supplying same to said detection means.

Alternatively, where said one of the network elements also normally receives via the optical transmission path a third optical signal (S3) at a different wavelength to that of said second optical signal (S2), the propagating and measuring means may further comprise a splitter connected to the coupler means for splitting corresponding optical signal portions (S2', S3') into two parts (S2", S3"), and filter means coupled to the splitter for separating the two parts according to wavelength before supplying same to said detection means.

Where the optical signals are analog, the measuring means may be arranged to extract the time-averaged optical power of the signal.

Where the optical signals comprise bursts of digital data alternating with lulls, the measuring means may be arranged to extract the optical power averaged over the duration of the individual bursts. More particularly, where the instrument is to be used for measuring power of optical signals comprised of "bursty" data streams (such as the ATM data signals), the measuring means may be arranged to extract the power only from the data bursts and not from any intervening series of digital zeros (i.e. lack of signal). Such bursty data streams are typical of both the upstream data sent by an optical network terminal (ONT) to a plurality of optical line terminals (OLTs) of a passive optical network (PON), and by the OLT to the plurality of ONTs.

The measuring means may comprise custom circuitry and/or a suitably-programmed microcomputer.

The test instrument may comprise display means for displaying measured values of the parameters.

According to yet another aspect of the invention, there is provided a method of measuring respective parameters of a first optical signal (S1) and a second optical signal (S2) propagating concurrently in opposite directions in an optical transmission path (16, 16/1, . . . , 16/9) between two network elements (10, 14/1, . . . , 14/9), at least one (14/1, . . . , 14/9) of the network elements being operative to transmit the first optical signal (S1) only if it continues to receive the second optical signal (S2). The method comprises the steps of: temporarily connecting first and second connector means (22, 24) of a portable test instrument into the optical transmission path in series therewith, and using the portable test instrument to propagate at least said second optical signal (S2) towards said at least one (14) of the network elements, and measure the parameter for each of the first optical signal (S1) and the second optical signal (S2). The portable test instrument comprises coupler means (32) having first and second ports (28, 30) connected to the first and second connector means, respectively, so that a path therebetween within the coupler means completes the optical transmission path, a third port (34) for outputting a portion of each optical signal received via the second port (30) and a fourth port (36) for outputting a portion of each optical signal received via the first port (28) and detection means (38, 42, 44) coupled to the third and fourth ports for converting the optical signal portions into corresponding electrical signals.

Where said one of the network elements also receives via the optical transmission path a third optical signal (S3) at a wavelength different from that of said second optical signal (S2), the propagating and measuring step may also measure a parameter of the third optical signal (S3).

Where said one of the network elements also receives via the optical transmission path a third optical signal (S3) co-propagating with the said second optical signal (S2) at a wavelength different from that of the said second optical signal (S2), the measuring step may further include the steps of splitting a portion of the co-propagating optical signals into two parts, each comprising portions of the second and third optical signals (S2, S3), separating each of the two parts according to wavelength, converting said parts into said second electrical signal and a third electrical signal, respectively, and also processing the third electrical signal to obtain a measured value of a parameter of the third optical signal (S3).

Alternatively, where said one of the network elements also receives via the optical transmission path a third optical signal (S3) co-propagating with the said second optical signal (S2) at a wavelength different from that of the said second optical signal (S2), said propagating and measuring step may employ a wavelength discriminator, for example a wavelength division multiplexer, connected to the coupler means for splitting a portion of the co-propagating optical signals into two parts each corresponding to a respective one of the second and third optical signals, converting the parts to said second electrical signal and a third electrical signal, and also processing the third electrical signal to obtain a measured value of a parameter of said third optical signal (S3).

Where the optical signals are analog, the measurement step may derive the time-averaged optical power of the signal.

Where the optical signals comprise bursts of digital data alternating with lulls, the measuring step may derive the average of the optical power of said optical signal averaged over the duration of the individual bursts. More particularly, where the instrument is to be used for measuring power of optical signals comprised of "bursty" data streams (such as ATM data signals), the measuring step may extract the power only from the data bursts and not from any intervening series of digital zeros (i.e., lack of signal).

According to still another aspect of the invention, there is provided a portable test instrument for measuring respective parameters of a first optical signal (S1) and a second optical signal (S2) propagating concurrently in opposite directions in an optical transmission path in a passive optical network (16, 16/1, . . . , 16/9) between an optical line terminal (10) and an optical network terminal (14/1, . . . , 14/9), the optical network terminal (14/1, . . . , 14/9) being operative to transmit the first optical signal (S1) only if it continues to receive the second optical signal (S2) from the optical line terminal (10), the portable test instrument comprising first and second connector means (22, 24) for temporarily connecting the portable test instrument into the optical transmission path in series therewith, and propagating and measuring means (32, 38, 46) connected between the first and second connector means for propagating at least said second optical signal (S2) towards said optical network terminal (14), the propagating and measuring means (32, 38, 46) being operable to measure the parameter for each of the first optical signal (S1) and the second optical signal (S2). The propagating and measuring means comprises coupler means (32) having first and second ports (28,30) connected to the first and second connector means, respectively, so that a path therebetween within the coupler means completes the optical transmission path, a third port (34) for outputting a portion of each optical signal received via the second port (30) and a fourth port (36) for outputting a portion of each optical signal received via the first port (28) and detection means (38, 42, 44) coupled to the third and fourth ports for converting the optical signal portions into corresponding electrical signals.

Various objects, features, aspects and advantages of the present invention will become more apparent from the following detailed description which describes embodiments by way of example only with reference to the accompanying drawings.

DETAILED DESCRIPTION

Figure 1:
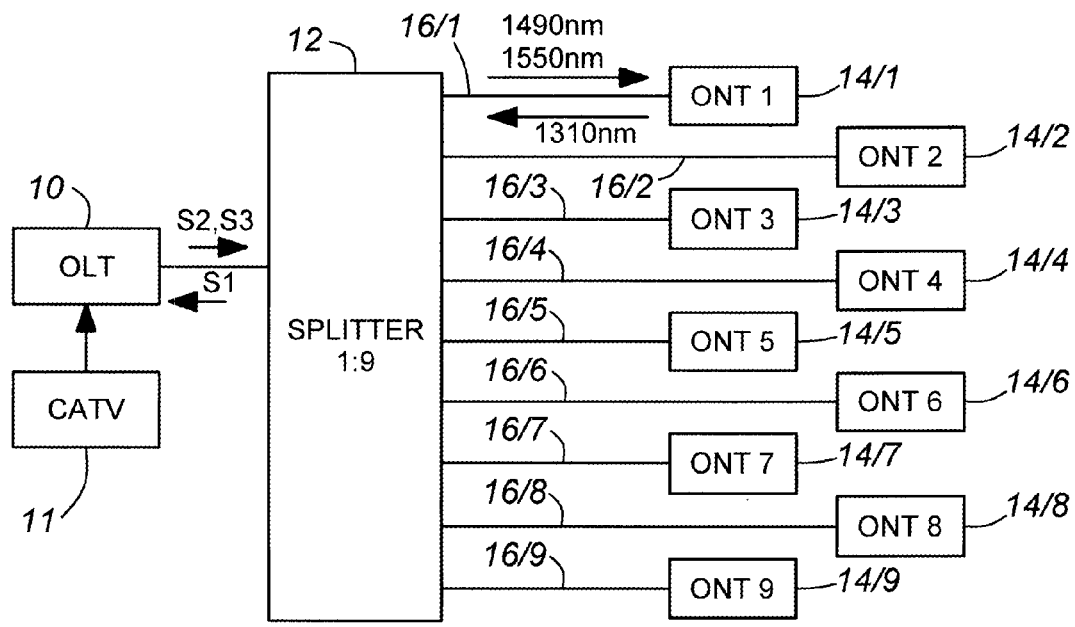
FIG. 1 is a simplified block schematic diagram of a portion of a passive optical network.

A portion of a passive optical network shown in FIG. 1 comprises a first element in the form of a central office optical line terminal (OLT) 10 coupled by a 1:9 splitter 12 to a plurality of other elements in the form of optical network terminals (ONT) 14/1 to 14/9, each coupled to a respective one of the nine ports of the splitter 12 by one of a corresponding plurality of optical waveguides 16/1 to 16/9. (It should be noted that, although nine terminals and a nine-port splitter are shown for convenience of illustration, there could be more or fewer in practice.) The terminals use asynchronous transfer mode (ATM) or similar protocol to encode the downstream (OLT to ONTs) and upstream (ONTs to OLT) digital data signals.

OLT 10 broadcasts to the ONTs 14/1 to 14/9 a downstream data signal (S2) at a wavelength of 1490-nm and a supplementary downstream signal (S3) at a wavelength of 1550-nm and, in known manner, encodes the 1490-nm data signals (S2) for synchronization purposes, the encoding being decoded by the ONTs and used to permit each of the ONTs 14/1 to 14/9 to send upstream, to the OLT 10, 1310-nm digital optical data signals S1 in its own unique time slot so as to avoid interference with signals from other ONTs connected to the same OLT 10. The signal S3, generally carrying cable television (CATV) information, is supplied by CATV source 11 shown connected to the OLT 10 and combined with the data signals S2 in known manner. (In practice, if signal S3 is a CATV signal, it will be inserted later).

If they do not receive the downstream signal (S2), and hence the synchronization information, the ONTs cannot normally transmit. For a field technician to make measurements of either two, or all three, of the signals, therefore, it is necessary for the ONTs 14/1 to 14/9 to continue receiving the downstream signals from the OLT 10.

A test instrument 18 which allows the upstream and downstream optical signals to continue propagating, while measuring the power of the optical signals S1, S2 and S3 at all three wavelengths, will now be described with reference to FIG. 2, which shows the instrument 18 connected into branch waveguide 16/9 between the splitter 12 and ONT 14/9. The test instrument 18 comprises a casing 20 having first 22 and second 24 bulkhead connector receptacles or ports shown coupled to the splitter 12 and ONT 14/9, respectively, connector receptacle 24 being connected to the ONT 14/9 by a short jumper 26.

Within the power meter casing 20, the connector receptacles 22 and 24 are connected to first and second ports 28 and 30, respectively, of a 2×2 optical coupler 32, having an approximately 80:20 splitting ratio, which ratio is approximately the same at all of the wavelengths to be measured (i.e., 1310 nm, 1490 nm, 1550 nm).

Thus, coupler 32 splits each of the signals S2, S3 and S1 received at ports 28 and 30, respectively, into two parts with a ratio of 80:20. The 80 percent signal portions are each routed back to the other of the two connectors 22 and 24 while the 20 percent signal portions S1' and S2', S3' are each routed to one of the corresponding third and fourth ports 34 and 36, respectively, of the coupler 32.

Port 34, which receives the 20 percent portion S1' of the signal S1 from the ONT 14/9, is connected by way of a filter 62, conveniently a 1310 nm bandpass filter, to a first photodetector 38 for detecting light at wavelengths nominally at 1310 nm. Port 36, which receives signal portions S2', S3' representing 20 percent of each of the 1490-nm and 1550-nm optical signals from the OLT 10, is coupled to a 1×2 optical splitter 40, having an approximately 90:10 splitting ratio that is approximately the same at all downstream wavelengths to be measured (i.e., 1490 nm, 1550 nm).

The 90 percent signal portions S2'' from splitter 40 are routed via the corresponding output optical fiber from the optical splitter 40 to a second bandpass filter 64, passing light within an approximately 15-nm wavelength band centered about 1490 nm and substantially attenuating light outside of this band (e.g. attenuation of greater than 40 dB at 1550 nm). The output S2''' of the second bandpass filter 64 is routed to a second photodetector 42, which detects light nominally at 1490 nm.

The 10 percent signal portion S3'' from splitter 40 is routed via the corresponding output optical fiber to a third bandpass filter 66, passing light within an approximately 25-nm wavelength band centered about approximately 1550 nm and substantially attenuating light outside of this band (e.g. greater than 20 dB for analog CATV signals, greater than 40 dB for digital CATV signals). The output Sr of the third bandpass filter 66 is coupled to the third photodetector 44, which detects light nominally at 1550 nm.

The three photodetectors 38, 42 and 44 supply their corresponding electrical signals to an electronic measuring unit 46 which comprises a set of three similar amplifiers 48, 50 and 52 for amplifying the electrical signals from photodetectors 38, 42 and 44, respectively. Power detectors 54 and 56 detect power of the amplified electrical signals from amplifiers 48 and 50, respectively, and supply the power measurements to a processor unit 58 which, using an internal analog-to-digital converter, converts them to corresponding digital signals which it processes to obtain the required parameter measurements, specifically power, and supplies the measurement information to a display unit 60 for display of the measurements in a conventional manner. The amplified signal from amplifier 52, corresponding to CATV signal S3, is supplied directly to the processor unit 58, i.e., without power detection, to provide a measure of average optical power.

The actual power measurements made by measuring means 18 will depend upon the nature of the signals being measured.

Where the optical signals are analog, the measuring means may be arranged to extract the time-averaged optical power of the signal.

Where the optical signals comprise bursts alternating with lulls, the measuring means may be arranged to extract the optical power of the bursts.

If the optical signals comprise bursty digital signals, the measuring means may be arranged to the extract the optical power of the bursts averaged over the duration of the burst. More particularly, where the instrument is to be used for measuring power of optical signals comprised of "bursty" data streams (such as the ATM data signals), the measuring means may be arranged to extract the power only from the data bursts and not from any intervening series of digital zeros (i.e. lack of signal). Such bursty data streams are typical of both the upstream data sent by an optical network terminal (ONT) to a plurality of optical line terminals (OLTs) of a passive optical network (PON), and by the OLT to the plurality of ONTs.

Typically, the field technician will disconnect the link 16/9 to ONT 14/9 at the home/premises etc. of the end-user at an existing "connectorized" coupling. The connector on the upstream part of the link 16/9 will then be connected to a specified one (22) of the two bulkhead connectors on the instrument, and the connector on the jumper 26 will be connected to the other. Of course, if a connectorized coupling between parts of the link 16/9 is available, the jumper 26 may not be needed.

While the link is disconnected, emission of the upstream data signals at wavelength 1310 nm by the ONT 14/9 will normally cease, and will then recommence when the two connectors are connected to their respective bulkhead connector receptacles 22,24 on the test instrument 18 and the ONT begins to receive the 1490 nm signal again. Measurements can then be taken.

The fact that there will be a temporary disruption in the line as the instrument 18 is inserted is not normally important, since the test instrument will normally be used in service calls where a problem has already been indicated by the customer.

Once the test instrument is inserted into the line, between the splitter 12 and the selected one of the ONTs 14/1 to 14/9 (see FIG. 1), 80% portions of the downstream data and video signals (i.e. at 1490 nm and 1550 nm, respectively) will pass directly through to the ONT 14/9. The ONT, thus synchronized via the received data signal, will then be able to emit its upstream (e.g. 1310-nm) data signal, an 80% portion of which will be sent upstream to the OLT 10, the other 20% portion being diverted to the detector 38.

It will be appreciated that the ratio of the coupler 32 need not be 80:20. Embodiments of the invention may employ different ratios. Generally, lower ratios entail more attenuation while higher ratios are more polarization-dependent. It should be noted, however, that preferred couplers are available commercially that have a particular band of wavelengths for which their ratios are substantially wavelength and polarization independent.

It will be appreciated that the invention is not limited to the measurement of optical power and to power meters, but could be applied to the measurement of other parameters, such as optical spectrum, bandwidth utilization in the transmission path or link, and so on. For example, the coupler 32 could be combined with an optical spectrum analyzer (OSA) which would replace the bandpass filters 62, 64, 66, the detectors 38, 42 and 44, the measuring means 46, and the display 60, and the optical splitter 40 would be replaced by a 2×1 coupler, preferably with a 50-50 splitting ratio, to couple the ports 34 and 36 of the 2×2 coupler 32 to the single input port of the OSA, thereby combining the two 20% signal portions. It will also be appreciated that the 2×1 coupler inherently will introduce a loss, typically of 50% or more.

Figure 2:
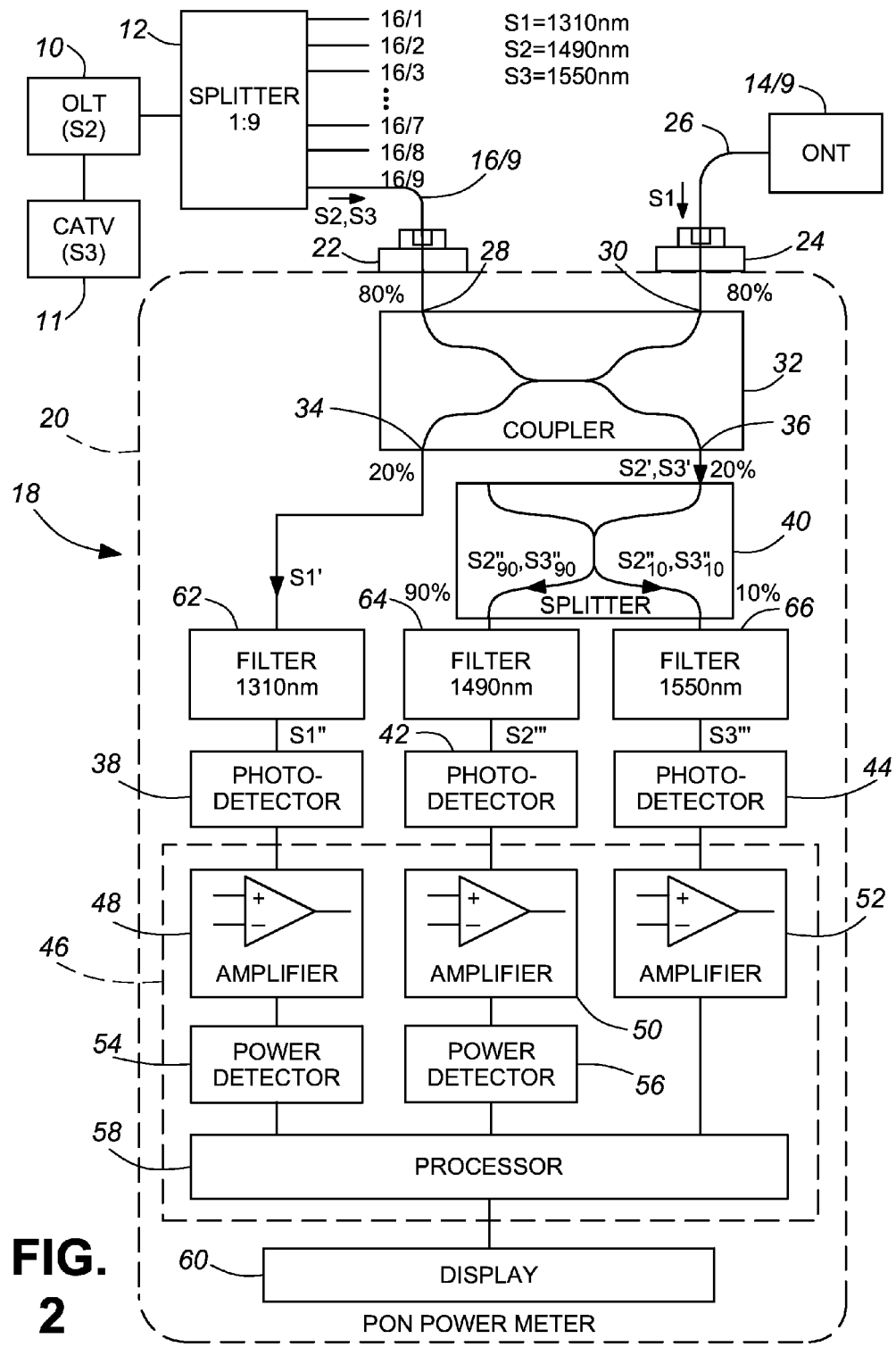
FIG. 2 is a simplified block schematic diagram of a power meter according to a first embodiment inserted into a branch of the network.

Of course, instead of the OSA, an alternative single-port device coupled to a 2×1 coupler could replace the components 38-66 of FIG. 2.

The bandpass filter 62 serves as a discrimination filter and is desirable to avoid undesired effects caused by optical back reflection of the 1550 nm signal, which can be acute when measurements are taken close to the OLT 10. It may be omitted, however, if the apparatus, e.g., test instrument, will normally be used close to the ONT terminal(s).

Figure 3:
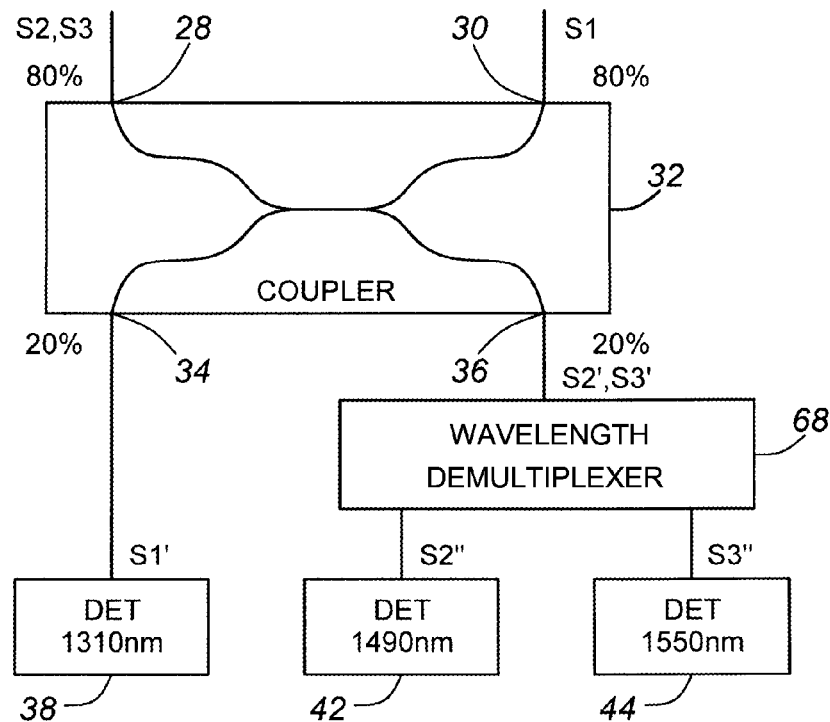
FIG. 3 is a detail view illustrating a modification.

As illustrated in FIG. 3, which shows a modification to the instrument 18, the splitter 40 and bandpass filters 64 and 66 may be replaced by a wavelength demultiplexer 68 (e.g., a low optical crosstalk WDM coupler) which separates the signals according to their respective wavelengths and supplies them to the detectors 42 and 44, respectively. It will be noted that FIG. 3 omits the bandpass filter 62, but it may be included for the reasons discussed above.

The electronic measuring unit 46 may be digital rather than analog, in which case it could be a suitably programmed microcomputer. Such digital signal processing potentially is more efficient, but also likely to be more expensive.

It should be appreciated that, although each of the ONTs must receive the optical signal S2 having a wavelength of 1490 nm, or it will not transmit its own optical signal S1 of 1310 nm wavelength, it is not essential for the ONTs to receive the optical signal S3 at 1550 nm transmitted by the OLT 10. Accordingly, FIG. 4 illustrates an alternative optical test instrument 18' which conveys only the 1490 nm signal to the ONT 14/9.

Figure 4:
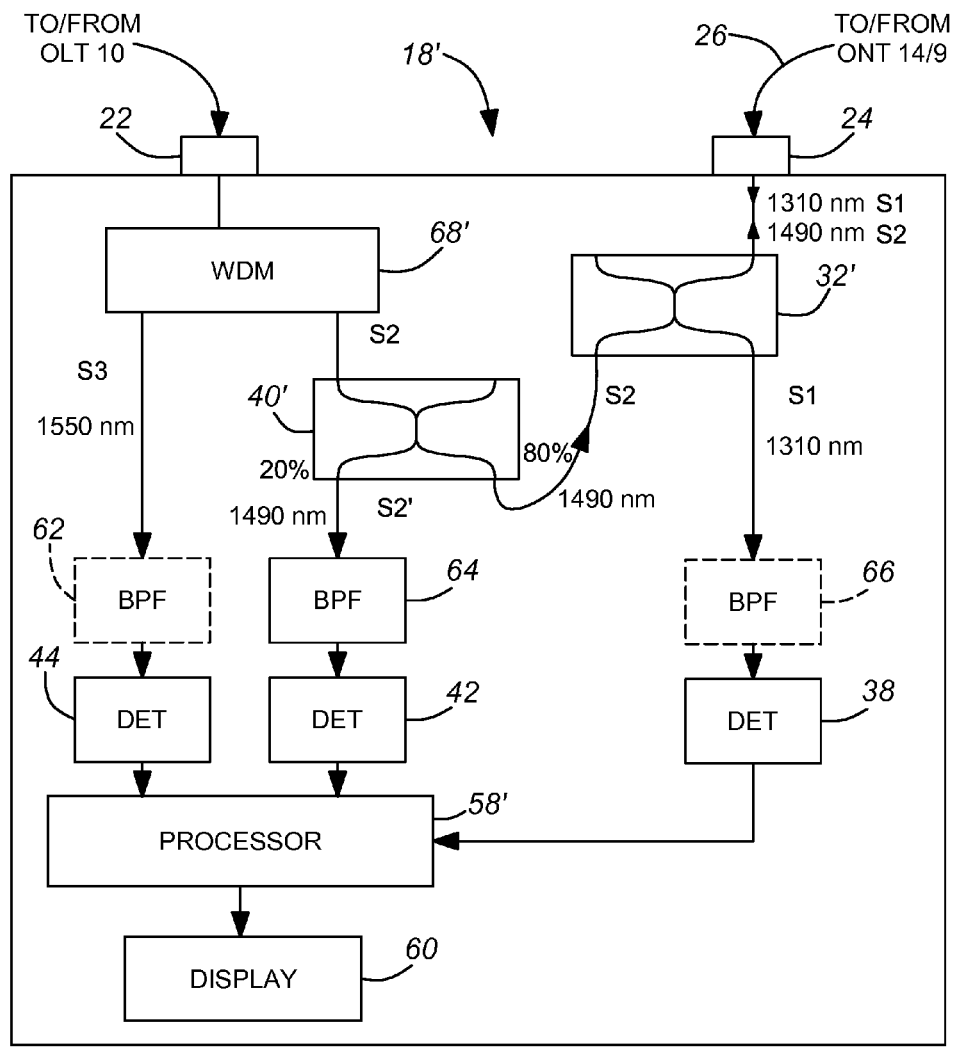
FIG. 4 is a simplified block schematic diagram of a power meter according to a second embodiment.

The optical power meter 18' shown in FIG. 4 comprises a wavelength-division-multiplexer 68' having a "combined" port connected to receptacle 22 and two "divided" ports coupled to detectors 42 and 44, respectively. The WDM 68' separates the 1490 nm and 1550 nm optical signals S2 and S3 according to wavelength and supplies them to detectors 42 and 44, respectively. The 1550 nm detector 44 is shown connected directly to the WDM 68' (or via an optional bandpass filter 62, shown in broken lines). The 1490 nm detector is shown connected by way of an 80:20 coupler 40' which receives the 1490 nm signal from the WDM 68' and splits it into first and second portions, namely an 80% portion and a 20% portion, conveying the 80% portion by way of a second coupler/splitter 32' to receptacle 24 for transmission to the ONT and conveying the 20% portion to the detector 42 via bandpass filter 64. The respective outputs of the detectors 42 and 44 are coupled to the processor 58 for processing of their corresponding electrical signals.

Second coupler/splitter 32' receives the 1310 nm signal S1 from ONT 14/9, via the receptacle 24, and splits the 1310 nm signal into two portions with a ratio of 80:20, conveying the 80% portion to the WDM 68' by way of the coupler 40' and the 20% portion to a detector 38 (or via an optional bandpass filter 66 shown in broken lines). The electrical signal from detector 38 is processed by the processor 58', as before.

Thus, with this arrangement, the 1490 nm signal from the OLT 10 passes to the ONT 14/9 via the fiber branch 16/9, the receptacle port 22, the WDM 68', the two couplers 40' and 32', receptacle 24 and fiber jumper/branch 26. Providing it is receiving the 1490 nm signal, the ONT 14/9 transmits its own 1310 nm signal, which follows substantially the same return path to the OLT 10. The couplers 32' and 40' extract respective small (20%) portions of the 1310 nm and 1490 nm signals for detection and processing, as required, by detectors 38, 42 and processor 58'.

It should be noted that, although the ONTs 14/1-14/9 need to receive the 1490 nm signal or they will not transmit their 1310 nm signals, it is not absolutely essential for the OLT 10 to receive those 1310 nm signals. Consequently, it would be possible for the WDM 68' to be adapted to allow the 1490 nm signals to pass, but block the 1310 nm signals. Such an arrangement will now be described with reference to FIG. 5, which illustrates an alternative test instrument 18" similar to that shown in FIG. 4, in that it includes a WDM 68" connected between receptacle port 22 and detectors 42 and 44, detector 42 being connected to WDM 68' by way of a filter 64 and detector 44 being coupled, optionally, by way of a filter 62, shown in broken lines. Likewise, receptacle port 24 is coupled to detector 38 by way of a coupler 32".

The test instrument 18" differs from that shown in FIG. 4, however, because it does not have a coupler/splitter 40' coupling the signal S2 (1490 nm) to receptacle port 24, i.e., the signal S2 is not simply conveyed through the power meter and a portion tapped off for measurement. Instead, the test instrument 18" uses optical-electrical-optical (OEO) regeneration to regenerate the optical signal S2 from the digital equivalent of the received signal S2 supplied to the processor 58" and then transmits the regenerated optical signal to the ONT as the signal S2 it must receive in order to transmit its own signal S1.

Thus, test instrument 18" has a modulatable optical source 70, such as a light-emitting diode (LED), driven by an electrical signal from the processor unit 58" (produced by means of an internal digital-to-analog converter) that is the optical equivalent of the electrical signal supplied to the processor 58" by detector 42. The optical output from the LED 70 is applied to coupler 32' which passes it to receptacle port 24 for transmission to the ONT 14/9. In this case, there is no optical continuity through the power meter 18", either upstream or downstream. Thus, the signals S2 and S3 are passed to detectors 42 and 44, respectively, via WDM 68" and the signal S1 passes from coupler 32' to detector 38.

Figure 5:
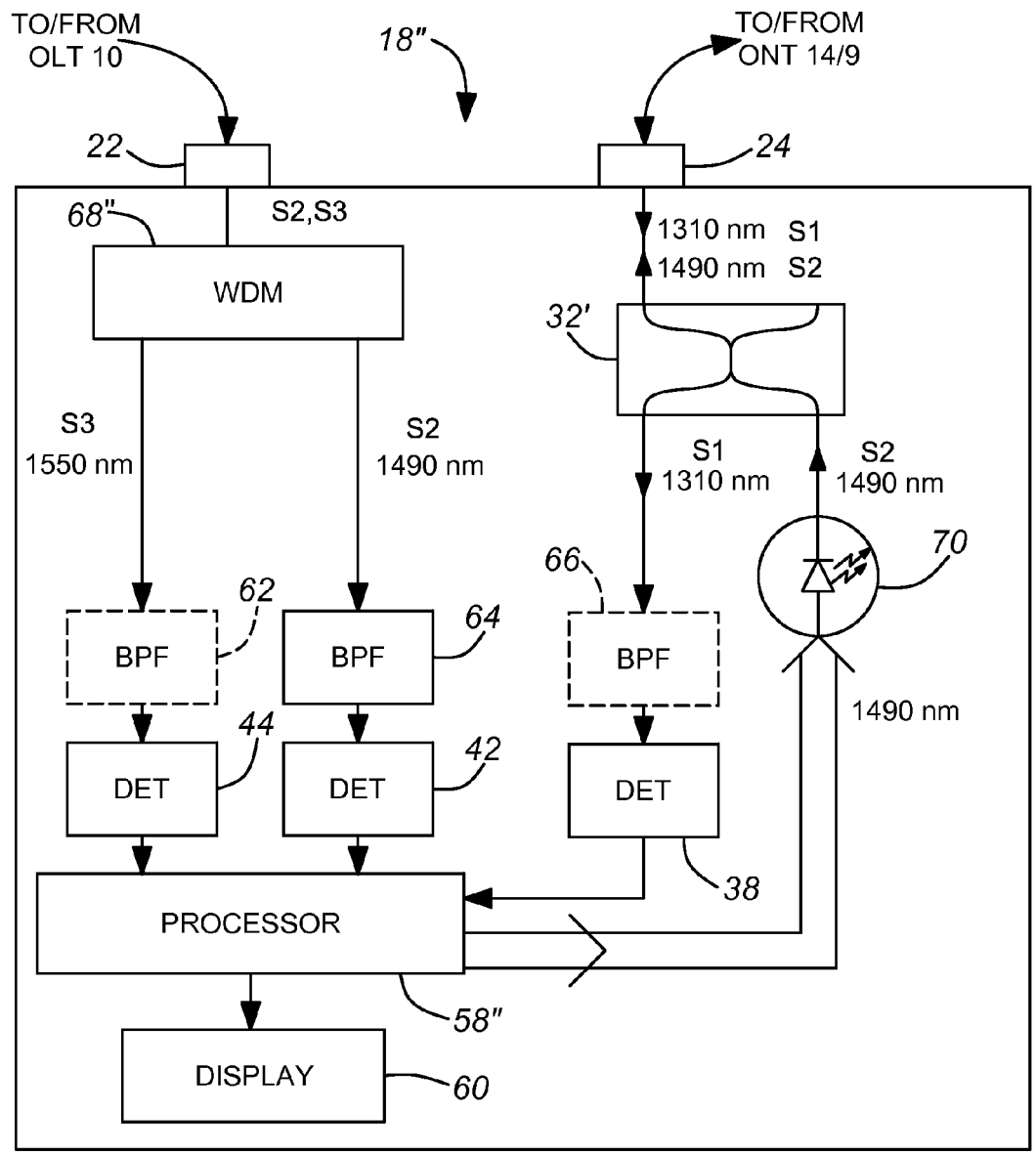
FIG. 5 is a simplified block schematic diagram of a power meter according to a third embodiment.

It should be appreciated that the splitter/coupler 32' in the instruments of FIGS. 4 and 5 could be replaced by a WDM coupler corresponding to the wavelengths 1310 nm and 1490 nm.

Figure 6:
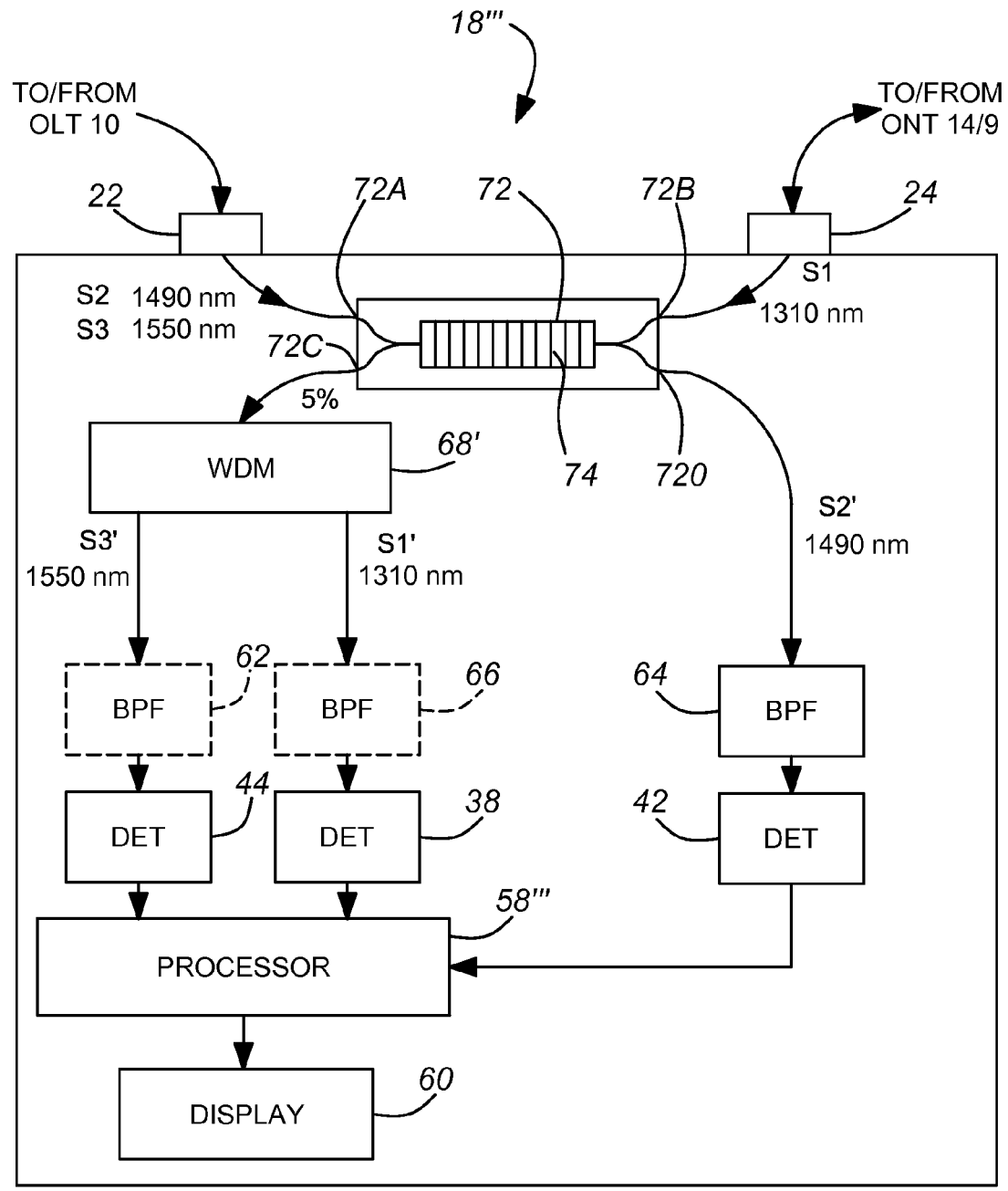
FIG. 6 is a simplified block schematic diagram of a power meter according to a fourth embodiment.

FIG. 6 illustrates yet another test instrument 18''' which is similar to that shown in FIG. 3, in that it includes a WDM 68', detectors 38, 42 and 44 for the 1310 nm, 1490 nm and 1550 nm signals, respectively, 1490 nm filter 64, a processor unit 58''' and, optionally, filters 62 and 66. It differs, however, in that coupler 32 is omitted and replaced by a coupler 72 with a wavelength-selective reflective device 74, such as a Bragg grating, written into the common path portion so as to reflect a portion, say about 5%, of the 1550 nm signal. The coupler 72 has ports 72A and 72B connected to the instrument ports 22 and 24, respectively, and ports 72C and 72D connected to the WDM 68' and detector 42, respectively, the latter by way of 1490 nm filter 64.

In operation, the coupler 72 receives the 1490 nm and 1550 nm signals from receptacle 22 and conveys a portion, about 95%, of the 1550 nm signal to port 24 for transmission to the ONT 14/9 and a portion, about 5%, to the detector 42. The Bragg grating 74 reflects a portion of the 1550 nm signal, about 5%, which leaves the coupler 72 via port 72C and is applied to WDM 68'. The 1310 nm signal from ONT 14/9 passes from receptacle port 24 to the coupler 72 and, leaving the coupler via port 72C, is conveyed to the WDM 68, along with the 5% portion S3ρ of the 1550 nm signal. The WDM 68' separates the 1550 nm signal and the 1310 nm signal according to wavelength and conveys them to detectors 38 and 44, respectively, optionally by way of bandpass filters 62 and 66, respectively.

Thus, the test instrument 18''' provides an optical path therethrough for all three of the optical signals S1, S2 and S3.

It should be appreciated that the power meter 18''' could be reconfigured to reflect a portion of the 1490 nm signal rather than the 1550 nm signal, i.e., by employing a different Bragg grating 74 and transposing the detectors 42 and 44, with their filters, as appropriate.

It should also be appreciated that, in all of the above-described embodiments, the filters could be bandpass filters or a combination of low-pass and high-pass filters, and that the filters for the 1310 nm and 1550 nm signals are optional.

Moreover, it should be noted that, in the embodiments of FIGS. 4, 5 and 6, the programming of processor 58', 58" or 58''' will be suitably modified as compared with that for the embodiment of FIG. 2. Such modification will not be described herein since it should be apparent to those skilled in this art.

It should be noted that, although FIGS. 1 and 2 show the third signal S3 inserted into the OLT 10, it could be inserted later in the transmission path, for example between the OLT 10 and the splitter 12. This is especially the case if the signal S3 is a CATV signal.

It will be appreciated that, although the above-described embodiments are described as monitoring data signals S1 and S2 and CATV signals S3, the invention comprehends instruments and methods for monitoring other optical signals.

INDUSTRIAL APPLICABILITY

Portable apparatus embodying the present invention may be inexpensive and easy-to-use. Ease of use is especially critical when they are used for testing FTTX networks since the maintenance field technicians are generally the same personnel who maintain wire telephone connections and rarely have had significant training in fiber-optic technology.

Although embodiments of the invention have been described and illustrated in detail, it is to be clearly understood that the same are by way of illustration and example only and not to be taken by way of limitation, the scope of the present invention being limited only by the appended claims.

What is claimed is:

1. A portable test instrument for measuring respective parameters of a first optical signal (S1) and a second optical signal (S2) propagating concurrently in opposite directions in an optical transmission path (16, 16/1, . . . , 16/9) between two network elements (10, 14/1, . . . , 14/9), at least one (14/1, ..., 14/9) of the network elements being operative to transmit the first optical signal (S1) only if it continues to receive the second optical signal (S2) from the other (10) of said network elements, the portable test instrument comprising first and second connector means (22, 24) for temporarily connecting the portable test instrument into the optical transmission path in series therewith, and propagating and measuring means (32, 38, 46) connected between the first and second connector means for propagating at least said second optical signal (S2) towards said at least one (14) of the network elements, the propagating and measuring means (32, 38, 46) being operable to measure the parameter for each of the first optical signal (S1) and the second optical signal (S2)

wherein the propagating and measuring means comprises coupler means (32) having first and second ports (28,30) connected to the first and second connector means, respectively, so that a path therebetween within the coupler means completes the optical transmission path, a third port (34) for outputting a portion of each optical signal received via the second port (30) and a fourth port (36) for outputting a portion of each optical signal received via the first port (28) and detection means (38, 42, 44) coupled to the third and fourth ports for converting the optical signal portions into corresponding electrical signals.

2. A portable test instrument according to claim 1, wherein, where the first optical signal (S1) comprises bursts of digital data alternating with lulls, the propagating and measuring means (46) is arranged to extract the average of the optical power of the first optical signal (S1) over the duration of the individual bursts.

3. A portable test instrument according to claim 2, wherein, where said one of the network elements (14/1, ..., 14/9) also receives via said optical transmission path a third optical signal (S3) at a different wavelength from that of said second optical signal (S2), the propagating and measuring means (46) further comprises means (40, 44, 52, 58; 44, 58, 68) for measuring a parameter of the third optical signal (S3).

4. A portable test instrument according to claim 3, wherein, where the third optical signal (S3) is analog, the propagating and measuring means (46) is arranged to extract the time-averaged optical power of the third optical signal (S3).

5. A portable test instrument according to claim 2, wherein, where said one of the elements (14/1, ..., 14/9) also normally receives via the optical transmission path a third optical signal (S3) at a different wavelength to that of said second optical signal (S2), the propagating and measuring means (46) further comprises a splitter (40) connected to the coupler means (32) for splitting corresponding optical signal portions (S2', S3') into two parts (S2", S3"), and filter means (64, 66) coupled to the splitter (40) for separating the two parts according to wavelength before supplying same to said detection means (38, 42, 44).

6. A portable test instrument according to claim 2, wherein, where said one of the elements (14/1, ..., 14/9) also normally receives via the optical transmission path a third optical signal (S3) at a wavelength different from that of said second optical signal (S2), said propagating and measuring means comprises a wavelength discriminator (68) connected to the coupler means (32) for separating at least a portion (S2', S3') of the combined second and third optical signals (S2, S3) according to wavelength to obtain corresponding separate parts (S2", S3") and supplying same to said detection means (38, 42, 44).

7. A portable test instrument according to claim 2, wherein the detection means comprises a separate detector (38, 42 44) for each of the measured optical signals.

8. A portable test instrument according to claim 2, wherein the propagating and measuring means (46) comprises custom circuitry.

9. A portable test instrument according to claim 2, wherein the propagating and measuring means (46) comprises a suitably-programmed microcomputer.

10. A portable test instrument according to claim 2, wherein said propagating and measuring means further comprises display means (60) for displaying measured parameter values.

11. A method of measuring respective parameters of a first optical signal (S1) and a second optical signal (S2) propagating concurrently in opposite directions in an optical transmission path (16, 16/1, ..., 16/9) between two network elements (10, 14/1, ..., 14/9), at least one (14/1, ..., 14/9) of the network elements being operative to transmit the first optical signal (S1) only if it continues to receive the second optical signal (S2), the method comprising the steps of:

temporarily connecting first and second connector means (22, 24) of a portable test instrument into the optical transmission path in series therewith, and using the portable test instrument to propagate at least said second optical signal (S2) towards said at least one (14) of the network elements, and measure the parameter for each of the first optical signal (S1) and the second optical signal (S2)

wherein the portable test instrument comprises coupler means (32) having first and second ports (28,30) connected to the first and second connector means, respectively, so that a path therebetween within the coupler means completes the optical transmission path, a third port (34) for outputting a portion of each optical signal received via the second port (30) and a fourth port (36) for outputting a portion of each optical signal received via the first port (28) and detection means (38, 42, 44) coupled to the third and fourth ports for converting the optical signal portions into corresponding electrical signals.

12. A method according to claim 11, wherein, where the first optical signal (S1) comprises bursts of digital data alternating with lulls, the measured parameter for the first optical signal (S1) comprises the average of the optical power of said first optical signal (S1) over the duration of the individual bursts.

13. A method according to claim 12, wherein, where said one of the network elements (14/1, ..., 14/9) also receives via the optical transmission path a third optical signal (S3) at a wavelength different from that of said second optical signal (S2), the measuring step also measures a parameter of the third optical signal (S3).

14. A method according to claim 13, wherein, where the third optical signal (S3) is analog, the time-averaged optical power of the third optical signal (S3) is derived.

15. A method according to claim 12, wherein, where said one of the network elements (14/1, ..., 14/9) also receives via the optical transmission path a third optical signal (S3) co-propagating with the said second optical signal (S2) at a wavelength different from that of the said second optical signal (S2), the measuring step includes the steps of splitting a portion of the co-propagating optical signals into two parts, each comprising portions of the second and third optical signals (S2, S3), separating each of the two parts according to wavelength, converting said parts into a second electrical signal and a third electrical signal, respectively, and also processing the third electrical signal to obtain a measured value of a parameter of the third optical signal (S3).

16. A method according to claim 12, wherein, where said one of the network elements (14/1, ..., 14/9) also receives via the optical transmission path a third optical signal (S3) co-propagating with the said second optical signal (S2) at a wavelength different from that of the said second optical signal (S2), said measuring step employs a wavelength discriminator (68) connected to the coupler means (32) for splitting a portion of the co-propagating optical signals into two parts each corresponding to a respective one of the second and third optical signals, converting the parts to a second electrical signal and a third electrical signal, and also processing the third electrical signal to obtain a measured value of a parameter of said third optical signal (S3).

17. A method according to claim 12, wherein the measuring step uses a separate detector (38, 42, 44) for each of the measured optical signals.

18. A method according to claim 12, wherein the step of measuring said parameter is performed using custom circuitry.

19. A method according to claim 12, wherein the step of measuring said parameter is performed using a suitably-programmed microcomputer.

20. A method according to claim 12, further comprising a step of displaying the measured parameter value.

21. A portable test instrument for measuring respective parameters of a first optical signal (S1) and a second optical signal (S2) propagating concurrently in opposite directions in an optical transmission path in a passive optical network (16, 16/1, ..., 16/9) between an optical line terminal (10) and an optical network terminal (14/1, ..., 14/9), the optical network terminal (14/1, ..., 14/9) being operative to transmit the first optical signal (S1) only if it continues to receive the second optical signal (S2) from the optical line terminal (10), the portable test instrument comprising first and second connector means (22, 24) for temporarily connecting the portable test instrument into the optical transmission path in series therewith, and propagating and measuring means (32, 38, 46) connected between the first and second connector means for propagating at least said second optical signal (S2) towards said optical network terminal (14), the propagating and measuring means (32, 38, 46) being operable to measure the parameter for each of the first optical signal (S1) and the second optical signal (S2)

wherein the propagating and measuring means comprises coupler means (32) having first and second ports (28, 30) connected to the first and second connector means, respectively, so that a path therebetween within the coupler means completes the optical transmission path, a third port (34) for outputting a portion of each optical signal received via the second port (30) and a fourth port (36) for outputting a portion of each optical signal received via the first port (28) and detection means (38, 42, 44) coupled to the third and fourth ports for converting the optical signal portions into corresponding electrical signals.

* * * * *